United States Patent
Liu et al.

(10) Patent No.: US 12,530,463 B2
(45) Date of Patent: Jan. 20, 2026

(54) METHOD FOR PATCHING SECURE BOOT IN IoT

(71) Applicant: Beken Corporation, Shanghai (CN)

(72) Inventors: Zhifu Liu, Shanghai (CN); Zhilei Wang, Shanghai (CN); Pujie Yang, Shanghai (CN)

(73) Assignee: Beken Corporation, Shanghai (CN)

( * ) Notice: Subject to any disclaimer, the term of this patent is extended or adjusted under 35 U.S.C. 154(b) by 473 days.

(21) Appl. No.: 18/171,583

(22) Filed: Feb. 20, 2023

(65) Prior Publication Data

US 2024/0202341 A1  Jun. 20, 2024

(30) Foreign Application Priority Data

Dec. 15, 2022 (CN) .......................... 202211615705.5

(51) Int. Cl.
*G06F 21/57* (2013.01)
*G06F 21/72* (2013.01)

(52) U.S. Cl.
CPC .......... *G06F 21/575* (2013.01); *G06F 21/725* (2013.01)

(58) Field of Classification Search
CPC .... G06F 21/575; G06F 21/725; G06F 21/572; G06F 9/44526
See application file for complete search history.

(56) References Cited

U.S. PATENT DOCUMENTS

| 9,568,970 B1* | 2/2017 | Kaushal | G06F 15/7825 |
| 2013/0055004 A1* | 2/2013 | Koniaris | G06F 1/10 |
| | | | 713/501 |
| 2013/0339939 A1* | 12/2013 | Ishikawa | G06F 8/65 |
| | | | 717/168 |
| 2017/0090909 A1 | 3/2017 | Guo et al. | |
| 2018/0088927 A1* | 3/2018 | Zhao | H04L 9/0643 |
| 2019/0250899 A1* | 8/2019 | Riedl | H04L 9/0825 |
| 2020/0336895 A1* | 10/2020 | Bartlett | H04L 9/3247 |
| 2021/0125143 A1* | 4/2021 | Bartlett | G06Q 10/0832 |
| 2022/0027140 A1* | 1/2022 | Jangamara Hosalli Mathad | |
| | | | G06F 21/44 |
| 2022/0029831 A1* | 1/2022 | Baek | G16Y 10/75 |
| 2024/0143772 A1* | 5/2024 | Farrell | G06F 9/4401 |
| 2025/0220403 A1* | 7/2025 | Smith | H04W 4/70 |

FOREIGN PATENT DOCUMENTS

| CN | 117834159 A | * | 4/2024 | .......... H04L 63/205 |
| JP | 2021164009 A | * | 10/2021 | |
| WO | WO-2021129151 A1 | * | 7/2021 | .......... G06F 11/1458 |

* cited by examiner

*Primary Examiner* — Khalid M Almaghayreh

(74) *Attorney, Agent, or Firm* — Schwegman Lundberg & Woessner, P.A.

(57) ABSTRACT

A method of patching a secure boot of an internet of things (IoT) device is provided. The method may include: loading a patch on a flash memory of a system-on-chip (SoC); generating a patch key corresponding to the loaded patch using a cryptographic algorithm; reading a pre-determined authentication key from a one-time programmable (OTP) memory of the SoC; comparing the patch key with the authentication key. In response to a comparison result that the patch key is the same as the authentication key, the method may include authenticating the patch; executing the authenticated patch on the SoC; and booting the SoC with the authenticated patch executed on the SoC.

15 Claims, 6 Drawing Sheets

METHOD FOR PATCHING SECURE BOOT IN IoT

CROSS REFERENCE TO RELATED APPLICATION

This application claims priority to and incorporates by reference Chinese patent application no. 202211615705.5 filed 15 Dec. 2022.

TECHNICAL FIELD

The present disclosure generally relates to patching. In particular, example embodiments of the present disclosure address systems and methods for patching a secure boot of a system-on-chip (SoC) in an Internet of Things (IOT) device.

BACKGROUND

The "Internet of Things" or "IoT" is a network of physical objects (referred to as "smart devices" or "IoT devices") that are embedded with sensors, software, and other technologies for enabling connection and exchange of data with other devices via the Internet. For example, the IoT devices are used in home automation to control lighting, heating and air conditioning, media and security systems, and camera systems. A number of IoT devices have been provided that function as smart home hubs to connect different smart home products. IoT devices have been used in a number of other applications as well. Application layer protocols and supporting frameworks have been provided for implementing such IoT applications.

The secure boot of IoT devices is an important process realized by software programs permanently written in a Read-only Memory (ROM). It uses a public key stored in a one-time programmable (OTP) memory to verify one or more programs to be executed. If the verification is successful, programs at subsequent levels are loaded and verified, and the process repeats. In this way, a chain of trust is formed, and the secure boot is the foundation and source of the chain of trust. When there is a problem or defect with the secure boot, an appropriate method for patching the secure boot is required.

Conventionally, IoT products do not supply the patching of the secure boot. Once a problem or defect with the secure boot is detected, the manufacturer has to reperform the costly tape-out process.

SUMMARY

According to one aspect of the present disclosure, a method for patching a secure boot of an IoT device is provided. The method may include loading a patch on a flash memory of the SoC and generating a patch key corresponding to the loaded patch using a cryptographic algorithm. The method may further include reading a pre-determined authentication key from an OTP memory of the SoC and comparing the patch key with the authentication key. The method may further include, in response to a comparison result that the patch key is the same as the authentication key, authenticating the patch, executing the authenticated patch on the SoC, and booting the SoC with the authenticated patch executed on the SoC.

According to another aspect of the present disclosure, a SoC is provided. The SoC may include a flash memory and a processor. The flash memory may be configured to store a patch. The processor may be configured to load the patch on the flash memory and generate a patch key corresponding to the loaded patch using a cryptographic algorithm. The processor may further be configured to read a pre-determined authentication key from an OTP memory of the SoC and compare the patch key with the authentication key. In response to a comparison result that the patch key is the same as the authentication key, the processor may further be configured to authenticate the patch, execute the authenticated patch on the SoC, and boot the SoC with the authenticated patch executed on the SoC.

According to another aspect of the present disclosure, a non-transitory computer-readable storage medium is provided. The computer-readable storage medium may include instructions. When executed by a computer, the instructions may cause the computer to load a patch on a flash memory of a SoC and generate a patch key corresponding to the loaded patch using a cryptographic algorithm. When executed by the computer, the instructions may further cause the computer to read a pre-determined authentication key from an OTP memory of the SoC and compare the patch key with the authentication key. When executed by the computer, the instructions may further cause the computer to, in response to a comparison result that the patch key is the same as the authentication key, authenticate the patch, execute the authenticated patch on the SoC, and boot the SoC with the authenticated patch executed on the SoC.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure relates to a method, a system, and an apparatus for patching a secure boot of an IoT device. The present disclosure provides examples of providing a secure and simple method to patch the secure boot and providing a method for verification and executing the patch before verifying the digital signature so that the verification of the digital signature can be patched.

The present disclosure introduces a verification of the patch at the beginning of the secure boot of the IoT device. First, a first patch hash value is pre-calculated and pre-stored in an OTP memory. The first patch hash value is compared with a second patch hash value which is calculated based on a patch read from the flash memory using a cryptographic algorithm (e.g., a hash algorithm). The patch is executed when the patch is verified (e.g., the patch hash values being the same). Regarding the verification of the patch, the present disclosure uses a verification of the patch hash values.

Therefore, the present disclosure has at least the following three advantages:
1. The software code related to secure boot, including the verification of the digital signature, can be patched.
2. System configuration related to the secure boot, including the verification of the digital signature (e.g., the clock frequency of a flash memory), can be patched.
3. The verification of the patch is fast.

Figure 1:
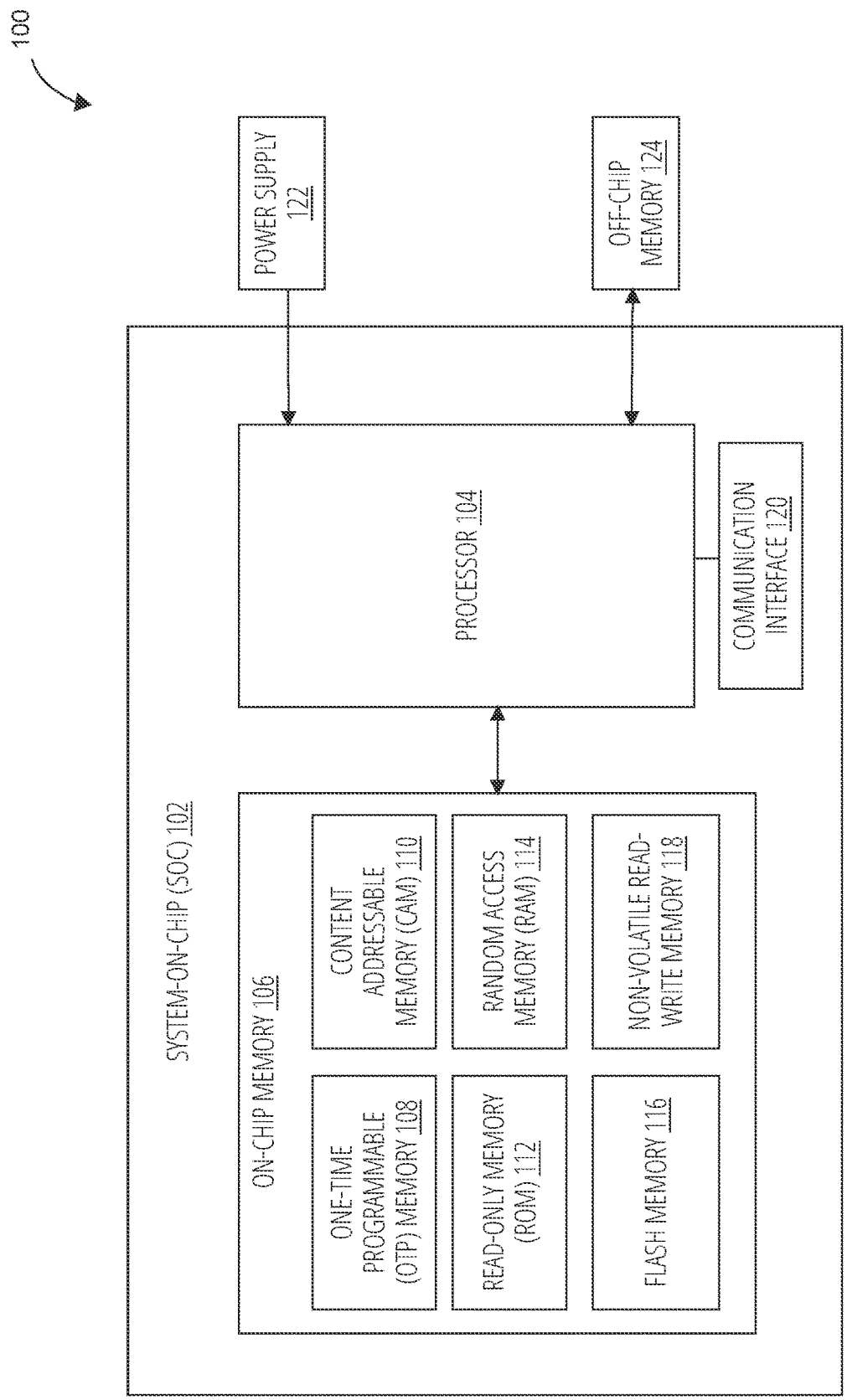
FIG. 1 is a block diagram illustrating an internet of things (IoT) device, in accordance with some example embodiments.

FIG. 1 is a block diagram illustrating an internet of things (IoT) device 100, in accordance with some example embodiments. The IoT device 100 may include a system-on-chip (SoC) 102, a power supply 122, and an off-chip memory 124. The SoC 102 may include a processor 104, on-chip memories 106, and a communication interface 120. The on-chip memories 106 may include a one-time programmable (OTP) memory 108, a content addressable memory (CAM) 110, a read-only memory (ROM) 112, a random-access memory (RAM) 114, a flash memory 116 and/or a non-volatile read-write memory (NVM) 118.

The processor 104 may perform arithmetical, logical, input/output (I/O), and other basic instructions. The processor 104 may make determinations, receive data from, and/or send data/instructions to other components of the IoT device 100.

The OTP memory 108 may be a special non-volatile memory that permits data to be written only once. Once the memory has been programmed, it retains its value upon losing power. OTP memory 108 may be used in applications where reliable and repeatable reading of data is required. Examples include boot code, encryption keys, and configuration parameters for analog, sensor, or display circuitry. In some embodiments, the OTP memory 108 may be replaced by an electronic fuse (eFuse) or a physical unclonable function (PUF). The OTP memory 108 may store preset values related to a patch, e.g., patch static address, patch loading address, patch hash value, etc.

The CAM 110 may be a data storage device that stores memory in cells. When any aspect of the memory is entered, the CAM 110 may compare the input with all the stored data. In the CAM 110, memories are not arranged in chronological order and are not packed in isolated modules.

The ROM 112 is a type of electronic storage built into the IoT device 100 during manufacturing. The ROM 112 may store "firmware," which is permanent software that's hard-wired with integrated circuits. The manufacturer may fit a specifically designed ROM chip into a device during the building process. Unlike the non-volatile memory of a hard drive, it's difficult and time-consuming to rewrite a ROM 112's memory.

The RAM 114 is a form of memory that can be read and changed in any order, typically used to store working data and machine code. The RAM 114 may allow data items to be read or written in almost the same amount of time irrespective of the physical location of data inside the memory, in contrast with other direct-access data storage media, where the time required to read and write data items varies significantly depending on their physical locations on the recording medium, due to mechanical limitations such as media rotation speeds and arm movement.

The flash memory 116 is a long-life and non-volatile storage chip widely used in embedded systems. The flash memory 116 can keep stored data and information even when the power is off. The flash memory 116 can be electrically erased and reprogrammed. In some embodiments, the flash memory 116 may include a patch executed on the IoT device 100. Because the flash memory 116 can be easily modified (in other words, attacked), the flash memory 116 may include additional data for secure purposes, such as a public key, an image hash value, a manifest signature, etc.

The NVM 118 is a type of computer memory that has the capability to hold saved data even if the power is turned off. Unlike volatile memory, NVM 118 does not require its memory data to be periodically refreshed. As mentioned above, the ROM 112 is a type of NVM, and the OTP memory 108, after programming once, also becomes a type of NVM. The NVM 118 herein may refer to other non-volatile memories. In some embodiments, the NVM 118 may be omitted.

The communication interface may facilitate communication between the IoT device 100 or a component thereof with an external device. The communication may be wired or wireless.

The power supply 122 may be an electrical device that supplies electric power to the SoC 102. In some embodiments, whenever the power supply 122 is turned on, the SoC 102 may perform a secure boot and/or an operation of patching the secure boot.

The off-chip memory 124 may be a memory that is not on the SoC 102. The off-chip memory 124 generally has more latency than on-chip memories 106, meaning less frequently used or less critical data may be stored in the off-chip memory 124. In some embodiments, the off-chip memory 124 may work as a substitute for one or more on-chip memories 106. For example, the off-chip memory 124 may store a patch and work as a substitute for the flash memory 116.

In some embodiments, the IoT device 100 may further include functional components based on desired functions of the IoT device 100. For example, the IoT device 100 may include a sensor, a speaker, a display, a light, a camera, a microphone, or the like, or any combination thereof.

It should be noted that although the present disclosure is described using the IoT device as an example, the present disclosure may be used in any other applicable systems or devices without departing from the spirit of the present disclosure. For example, the present method can be used by any device, including a SoC with a demand of patching secure boot of the device, or even a device including only a flash memory, an OTP memory, and a processor, with a demand of patching secure boot of the device.

Figure 2:
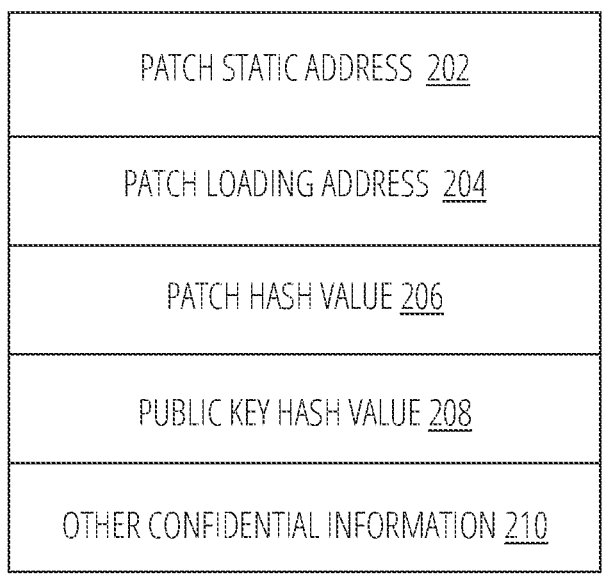
FIG. 2 is a schematic diagram illustrating data stored in a one-time programmable (OTP) memory of the IoT device, in accordance with some example embodiments.

FIG. 2 is a schematic diagram illustrating data stored in a one-time programmable (OTP) memory 108 of the IoT device 100, in accordance with some example embodiments.

As shown in FIG. 2, the OTP memory 108 may include a patch static address 202, a patch loading address 204, a patch hash value 206, a public key hash value 208, and/or other confidential information 210.

The patch static address 202 may be an address data pointing to a first address in the flash memory where the patch is stored. The patch static address 202 may be preset by the IoT device 100 or a designer or manufacturer before the IoT device 100 is released to the public. If no patch is required to be executed on the IoT device 100 (e.g., no defect of the IoT device is investigated or no patch is currently available), the patch static address 202 may be preset to be zero. In some embodiments, the patch static address 202 may be permanently written on the OTP memory 108. It should be noted that if the patch static address 202 is non-zero, a designer or manufacturer of the IoT device 100 may store a patch desired to be executed in the corresponding address in the flash memory before the IoT device 100 is released to the public.

The patch loading address 204 may be an address data pointing to a second address in the flash memory where the patch should be loaded. The patch loading address 204 may be preset by the IoT device 100 or a designer or manufacturer before the IoT device 100 is released to the public. Similar to the patch static address 202, if no patch is required to be executed on the IoT device 100 (e.g., no defect of the IoT device is investigated or no patch is currently available), the patch loading address 204 may be preset to be zero. In some embodiments, the patch loading address 204 may be permanently written on the OTP memory 108. It should be noted that if the patch static address 202 is non-zero, the flash memory should have pre-allocated empty space corresponding to the patch loading address so that the patch may be loaded. In some embodiments, the patch loading address 204 may be omitted. In this case, the patch is loaded at its patch static address 202.

The patch hash value 206 may be a value calculated based on a patch (e.g., patch 308) using a cryptographic algorithm. The patch hash value 200 may also be referred to as an authentication key elsewhere in the present disclosure. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm.

Merely by way of example, the length of the patch hash value 206 may be associated with the used cryptographic algorithm. For example, the patch hash value 206 is generated using an SHA-256 algorithm and is 256-bit long. In some embodiments, the patch hash value 206 may be pre-calculated and preset by the IoT device 100 or a designer or manufacturer before the IoT device 100 is released to the public. Similar to the patch static address 202, if no patch is required to be executed on the IoT device 100 (e.g., no defect of the IoT device is investigated or no patch is currently available), the patch hash value 206 may be preset to be zero. In some embodiments, the patch hash value 206 may be permanently written on the OTP memory 108.

It should be noted that once the patch hash value 206 is calculated and preset in the OTP memory 108, the patch (e.g., patch 308) stored in the flash memory cannot be changed. Otherwise, a comparison between a patch key (a key later calculated based on the patch using a cryptographic algorithm) and the patch hash value 206 may fail, and the patch cannot be successfully executed on the IoT device 100. Details regarding such comparison may be found elsewhere in the present disclosure. See, e.g., operations 410-416 in FIG. 4 and descriptions thereof.

The public key hash value 208 may be a value calculated based on a public key (e.g., public key 304) using a cryptographic algorithm. The patch hash value 206 and the public key hash value 208 may be calculated using the same or different cryptographic algorithm. For example, the public key hash value 208 is calculated using an SHA-256 algorithm and is 256-bit long. In some embodiments, the public key hash value 208 may be verified in a secure boot of the IoT device after the patch is authenticated and executed.

The other confidential information 210 may include information related to the secure boot of the IoT device 100. For example, the other confidential information 210 may include a secure boot flag. If the secure boot flag is "on," the IoT device 100 may perform the secure boot after the patch is authenticated and executed; otherwise, the IoT device 100 may skip the secure boot after the patch is authenticated and executed.

Figure 3:
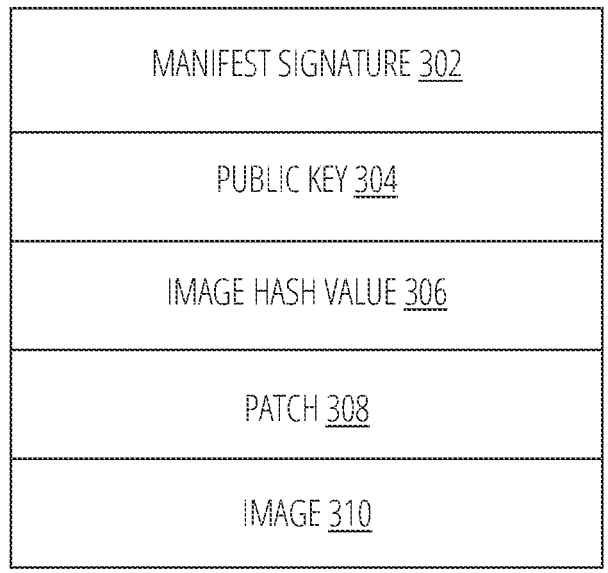
FIG. 3 is a schematic diagram illustrating data stored in a flash memory of the IoT device, in accordance with some example embodiments.

FIG. 3 is a schematic diagram illustrating data stored in a flash memory 116 of the IoT device 100, in accordance with some example embodiments. As shown in FIG. 3, the flash memory 116 may include a digital signature 302, a public key 304, an image hash value 306, a patch 308, and/or an image 310.

The manifest signature (also referred to as digital signature) 302 may be a value calculated based on a manifest and a private key. The manifest may refer to the public key 304, the image hash value 306, and/or the patch 308, collectively. The private key may be paired with the public key 304. Any information encrypted by a private key may be decrypted to the original information using a public key or vice versa. The private key may be unknown to anyone except the designer or manufacturer.

The IoT device 100 may decrypt the manifest signature 302 using the public key 304 to generate a first manifest hash value. The IoT device 100 may also generate a second manifest hash value based on the manifest using a cryptographic algorithm. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm.

In some embodiments, the secure boot of the IoT device may include comparing the first manifest hash value with the second manifest hash value. Details regarding such comparison may be found elsewhere in the present disclosure. See, e.g., operation 606 in FIG. 6 and the descriptions thereof.

The public key 304 may be a series of numbers created by a symmetric or asymmetric algorithm. The public key 304 may be generated with a paired private key based on the symmetric or asymmetric algorithm. For the symmetric algorithm, the generated public key 304 and the paired private key are the same. For the asymmetric algorithm, the generated public key 304 and the paired private key are different.

As described above, the public key 304 may be used to decrypt the manifest signature 302 to generate a first manifest hash value. The IoT device 100 may generate a public key hash value using a cryptographic algorithm based on the public key 304. The public key hash value may be compared with a public key hash value pre-stored in the OTP memory 108 (e.g., public key hash value 208). Details regarding such comparison may be found elsewhere in the present disclosure. See, e.g., operation 604 in FIG. 6 and the descriptions thereof.

The image hash value 306 may be a value generated based on the image 310 using a cryptographic algorithm. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm. Merely by way of example, the image hash value 306 is generated using the SHA-256 algorithm and is 256-bit long. It should be noted that the image 310 used herein may refer to a code image of executable programs rather than pictures. After the secure boot of the IoT device 100 is passed, the image 310 may be executed by the IoT device 100 to perform certain functions.

The patch 308 may include a code image of a patch that is desired to be applied to the IoT device 100. In some embodiments, the patch 308 may be designed to cure a problem or a defect in the IoT device 100 or to update part or all of the IoT device 100. For example, the patch 308 may change at least one hardware property of the SoC 102 (e.g., a clock frequency of the flash memory) of the IoT device 100. As another example, the patch 308 may change a software function related to the booting of the IoT device 100. The change of the software function may be realized by, for example, changing a function call table stored in the ROM 112.

Figure 4:
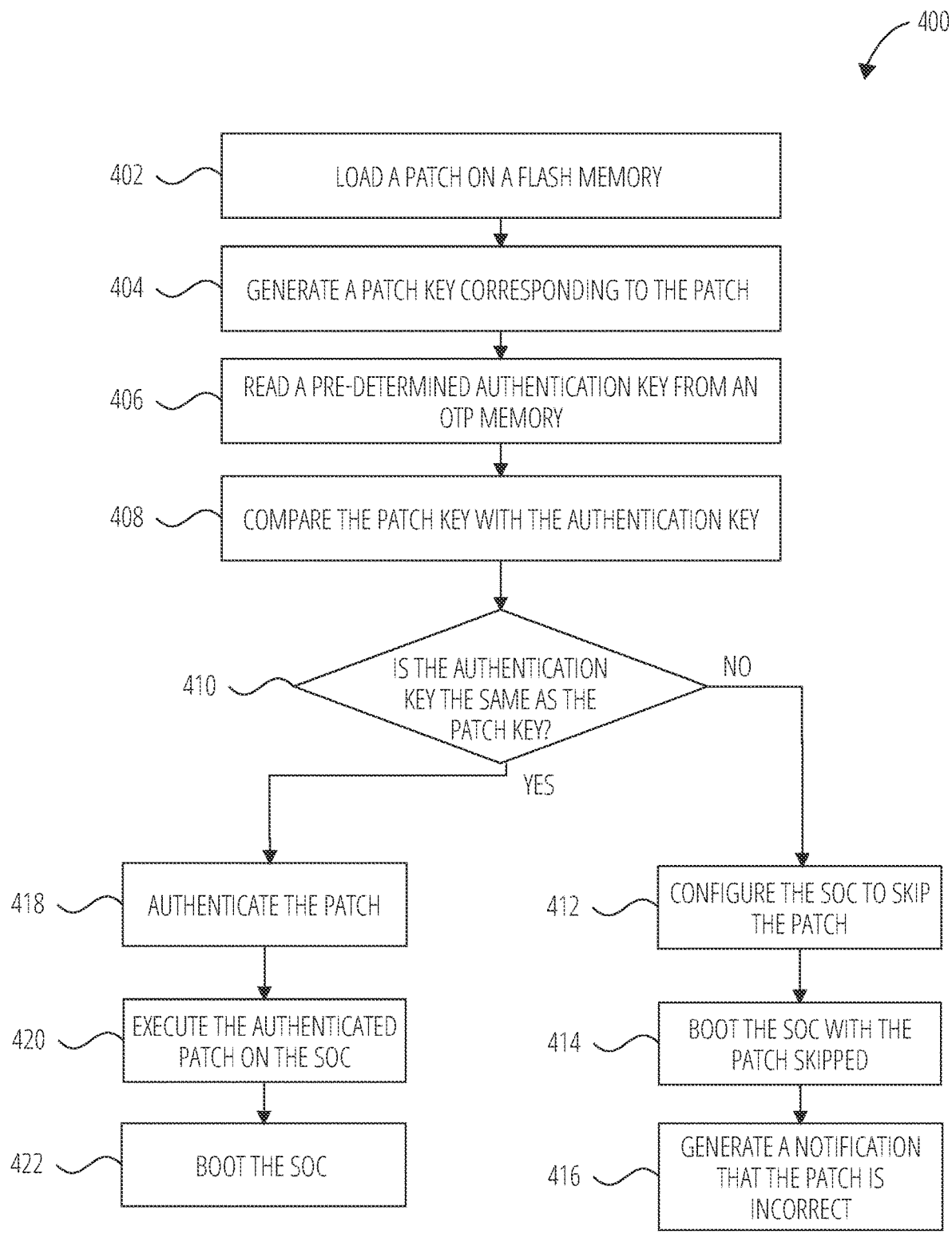
FIG. 4 is a flowchart illustrating operations of the IoT device in performing a method for patching a secure boot of the system on chip (SoC) of the IoT device, in accordance with some example embodiments.

FIG. 4 is a flowchart illustrating operations of the IoT device in performing a method for patching a secure boot of the system on chip (SoC) of the IoT device, in accordance with some example embodiments. The method 400 may be embodied in computer-readable instructions for execution by one or more processors such that operations of the method 400 may be performed in part or in whole by the functional components of the IoT device 100; accordingly, the method 400 is described below by way of example with reference thereto. However, it shall be appreciated that at least some of the operations of the method 400 may be deployed on various other hardware configurations than the IoT device 100. Also, the operations of the method 400 may be partially omitted, or performed in any order.

In operation 402, the IoT device 100 may load a patch (e.g., patch 308) on a flash memory (e.g., flash memory 116). The patch may be pre-stored in the flash memory, and the operation 402 may include transferring the patch from a first address (e.g., patch static address 202) in the flash memory to a second address (e.g., patch loading address 204) in the flash memory. In some embodiments, the patch may also be transferred from the flash memory to be loaded on an OTP memory (e.g., the OTP memory 108). However, such a configuration may increase the risk of being attacked if the patch contains malware or is damaged. Operation 402 is further described in detail in method 500 in FIG. 5 and the descriptions thereof.

In operation 404, the IoT device 100 may generate a patch key corresponding to the patch. In some embodiments, the patch key may be generated using a cryptographic algorithm based on the patch. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm. The length of the patch key may be associated with the used cryptographic algorithm. Merely by way of example, the patch key is generated using the SHA-256 algorithm and is 256-bit long.

In operation 406, the IoT device 100 may read a predetermined authentication key (e.g., patch hash value 206) from an OTP memory. The authentication key may be generated based on the patch during the manufacturing of the IoT device 100. The authentication key may be permanently written on the OTP memory. The authentication key may be the same length as the patch key, e.g., 256-bit long.

In operation 408, the IoT device 100 may compare the patch key with the authentication key. In some embodiments, operation 408 may include comparing the whole patch key with the whole authentication key. Alternatively, the operation 408 may include comparing a part (e.g., first 32 bits) of the patch key with a corresponding part (e.g., first 32 bits) of the authentication key.

In operation 410, the IoT device 100 may determine whether the authentication key is the same as the patch key. In response to a determination that the authentication key is the same as the patch key, the method 400 proceeds to operation 418; otherwise, the method 400 proceeds to operation 412.

In operation 412, the IoT device 100 may configure the SoC 102 to skip the patch.

In operation 414, the IoT device 100 may boot the SoC 102 with the patch skipped. For example, the IoT device 100 may change a function call table in the ROM 112 to boot the SoC 102 with the patch skipped. The IoT device 100 may also overwrite zeros to the patch static address 202, patch loading address 204, and/or patch hash value 206.

In operation 416, the IoT device 100 may generate a notification that the patch is incorrect. In some embodiments, the notification may be generated to one or more components of the IoT device 100. Additionally, or alternatively, the notification may be generated to an external device (e.g., a user mobile device, a server) via, e.g., the communication interface 120.

In operation 418, the IoT device 100 may authenticate the patch. In operation 420, the IoT device 100 may execute the authenticated patch on the SoC 102. In some embodiments, the patch may be executed to change at least one hardware property of the SoC 102 of the IoT device 100. For example, the patch may be executed to increase the clock frequency of the flash memory 116 from 100 MHz to 360 MHz. Additionally, or alternatively, the patch may be executed to change a software function of the IoT device 100. For example, the software function may be related to the booting of the IoT device 100. Specifically, the secure boot of the IoT device 100 may include one or more secure check operations. The patch may cause the one or more secure check operations to be performed in a different order, to be modified, to be omitted, to be performed at an earlier or different time, and/or to have a termination condition. Merely by way of example, the change of the software function may be realized by changing a function call table stored in the ROM 112.

In operation 422, the IoT device 100 may boot the SoC 102. In some embodiments, during or before the booting of the SoC, a secure boot that comprises one or more secure check operations may be performed to ensure that the IoT device 100 is in a safe condition. Details regarding the secure boot may be found in method 6 in FIG. 6 and the descriptions thereof.

Figure 5:
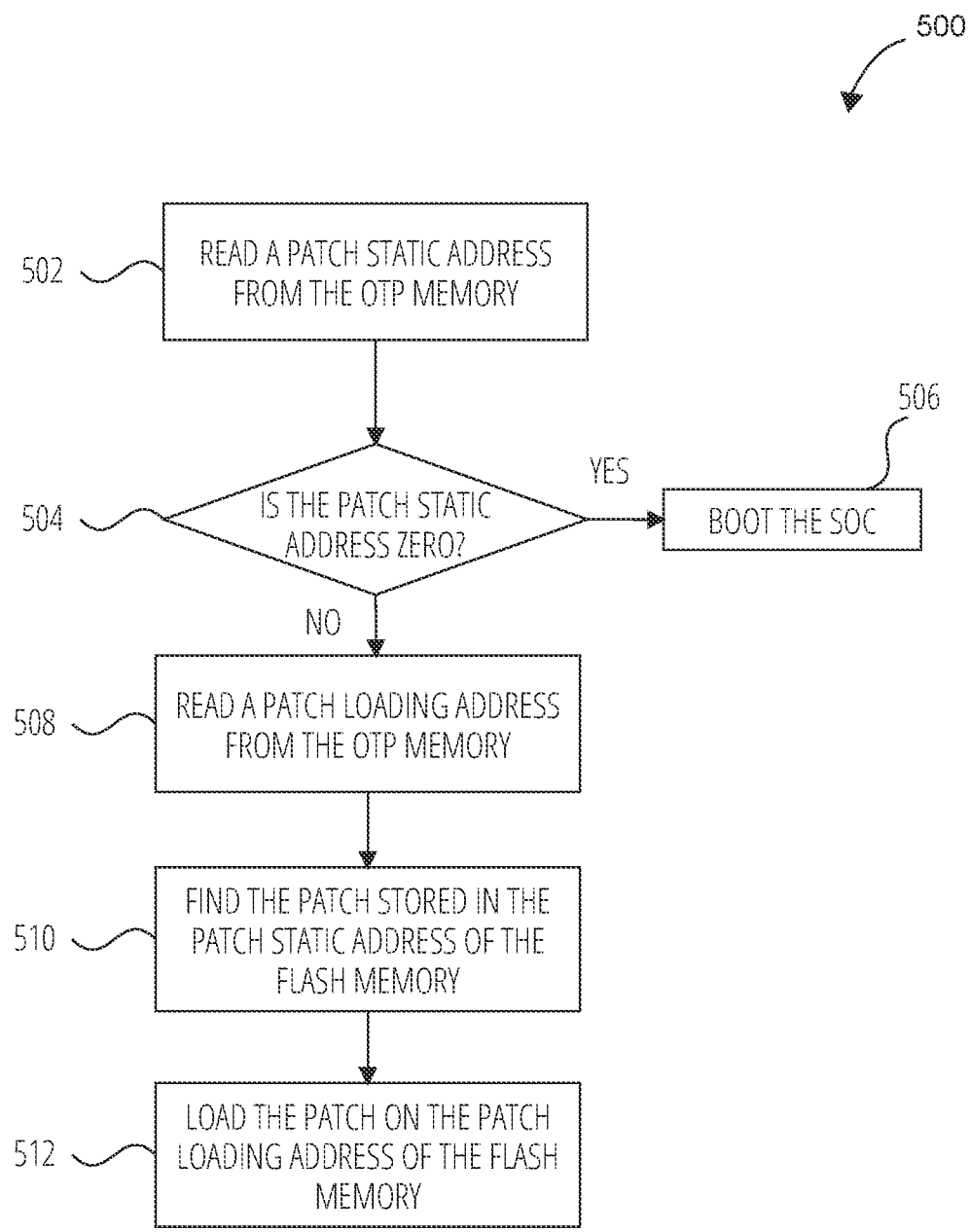
FIG. 5 is a flowchart illustrating operations of the IoT device in performing a method for loading a patch on the flash memory, in accordance with some example embodiments.

FIG. 5 is a flowchart illustrating operations of the IoT device in performing a method for loading a patch on the flash memory, in accordance with some example embodiments. The method 500 may be embodied in computer-readable instructions for execution by one or more processors such that operations of the method 500 may be performed in part or in whole by the functional components of the IoT device 100; accordingly, the method 500 is described below by way of example with reference thereto. However, it shall be appreciated that at least some of the operations of the method 500 may be deployed on various other hardware configurations than the IoT device 100. Also, the operations of the method 500 may be partially omitted, or performed in any order.

In operation 502, the IoT device 100 may read a patch static address (e.g., patch static address 202) from the OTP memory (e.g., OTP memory 108). The patch static address may be an address data pointing to an address in the flash memory where the patch is stored. The patch static address may be preset by the IoT device 100 or a designer or manufacturer before the IoT device 100 is released to the public. If no patch is required to be executed on the IoT device 100 (e.g., no defect of the IoT device is investigated or no patch is currently available), the patch static address may be preset to be zero. In some embodiments, the patch static address may be permanently written on the OTP memory.

In operation 504, the IoT device 100 may determine whether the patch static address is zero. In response to a determination that the patch static address is zero, which indicates that no patch is required to be executed, the method 500 may proceed to 506; otherwise, the method 500 may proceed to 508.

In operation 506, the IoT device 100 may boot the SoC 102. Similar to operation 422, during or before the booting of the SoC, a secure boot that comprises one or more secure check operations may be performed to ensure that the IoT device 100 is in a safe condition.

In operation 508, the IoT device 100 may read a patch loading address (e.g., patch loading address 204) from the OTP memory. The patch loading address may be an address data pointing to an address in the flash memory where the patch should be loaded. The patch loading address may be preset by the IoT device 100 or a designer or manufacturer before the IoT device 100 is released to the public. Similar to the patch static address, if no patch is required to be executed on the IoT device 100 (e.g., no defect of the IoT device is investigated or no patch is currently available), the patch loading address may be preset to be zero. In some embodiments, the patch loading address may be permanently written on the OTP memory 108.

In operation 510, the IoT device 100 may find the patch stored in the patch static address of the flash memory based on the patch static address read from the OTP memory in operation 502.

In operation 512, the IoT device 100 may load the patch on the patch loading address of the flash memory. In some embodiments, a patch hash value (also referred to as a patch key) may be determined based on the loaded patch using a cryptographic algorithm. The patch hash value may then be compared with an authentication key that is pre-stored in the OTP memory in authentication or verification of the patch.

Figure 6:
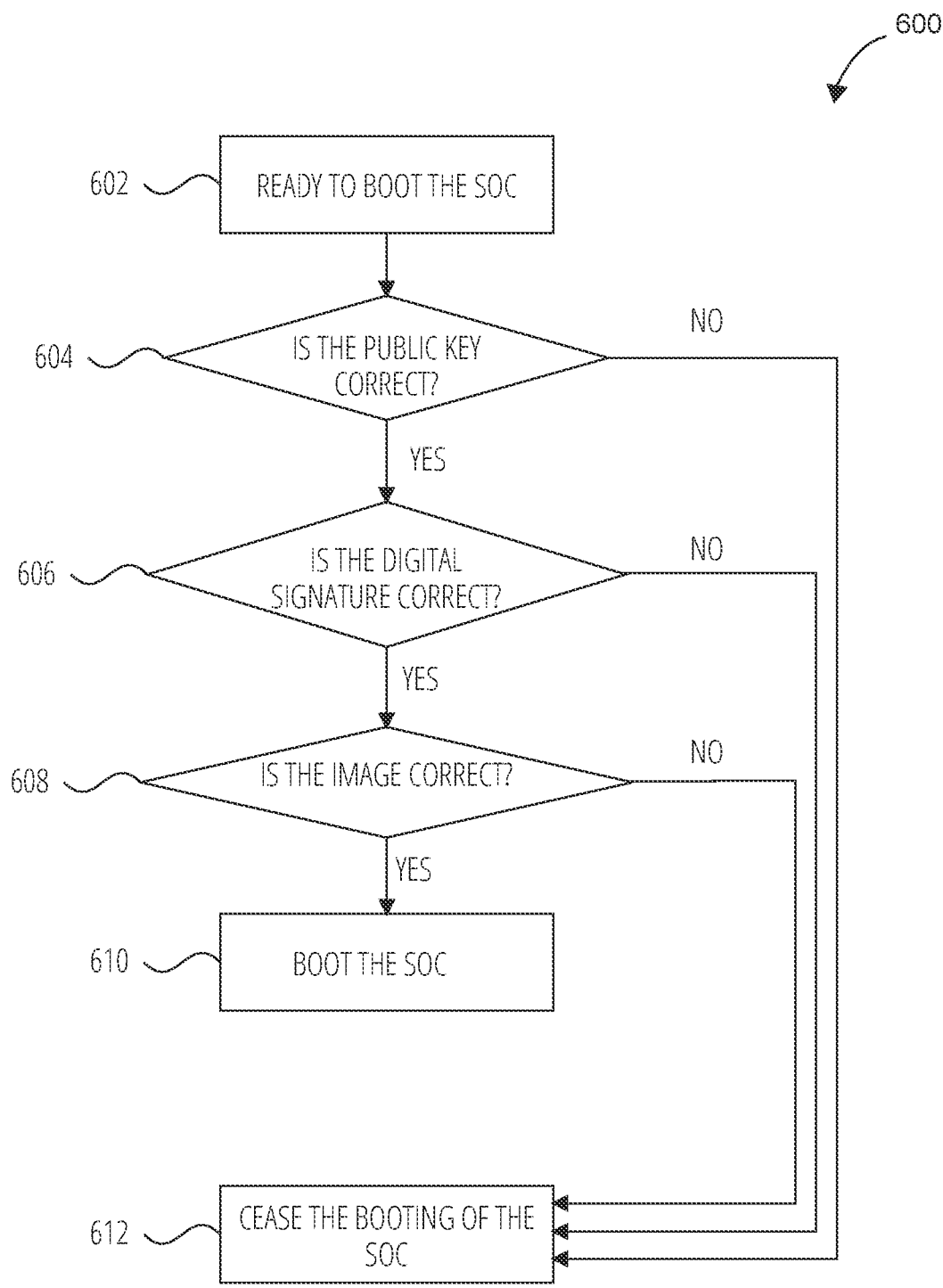
FIG. 6 is a flowchart illustrating operations of the IoT device in performing a method for ceasing the booting of the SoC of the IOT device, in accordance with some example embodiments.

FIG. 6 is a flowchart illustrating operations of the IoT device in performing a method for ceasing the booting of the SoC of the IOT device, in accordance with some example embodiments. The method 600 may be embodied in computer-readable instructions for execution by one or more processors such that operations of the method 600 may be performed in part or in whole by the functional components of the IoT device 100; accordingly, the method 600 is described below by way of example with reference thereto. However, it shall be appreciated that at least some of the operations of the method 600 may be deployed on various other hardware configurations than the IoT device 100. Also, the operations of the method 600 may be partially omitted, or performed in any order.

It should also be noted that method 600 is a critical component of a secure boot of the IoT device 100. Operations 604, 606, and 608 are secure check operations (each with a requirement associated with the secure boot) and are merely examples. A person having ordinary skills in the art may add more secure check operations, delete some or all of the one or more secure check operations, or modify some or all of the one or more secure check operations. Such addition, modification, and deletion shall be protected by the present disclosure.

In operation 602, the IoT device 100 may be ready to boot the SoC 102. This operation may be an inherent and immediate operation or status after the IoT device 100 passes an authentication of a patch, as illustrated in operation 422, fails an authentication of a patch, as illustrated in operation 414, or skips a patch, as illustrated in operation 506.

In operation 604, the IoT device 100 may determine whether the public key is correct. In some embodiments, the operation 604 may include: reading a first public key hash value (e.g., the public key hash value 208) from an OTP memory (e.g., the OTP memory 108); determining a second public key hash value based on a public key (e.g., public key 304) stored in a flash memory (e.g., the flash memory 116) using a cryptographic algorithm; and comparing the first public key hash value with the second public key hash value. If the first public key hash value is the same as the second public key hash value, the IoT device 100 may determine that the public key is correct and the method 600 proceeds to operation 606; otherwise, the IoT device 100 may determine that the public key is incorrect and the method 600 proceeds to operation 612.

In operation 606, the IoT device 100 may determine whether the digital signature is correct. The digital signature may be encrypted by a private key based on a hash value corresponding to the original information (also referred to as manifest or signature data). In some embodiments, the operation 606 may include: generating a first digital signature value based on signature data (e.g., a manifest, including public key 304, image hash value 306, and/or patch 308) from the flash memory using a cryptographic algorithm; generating a second digital signature value based on a digital signature (e.g., the manifest signature 302) read from the flash memory and a public key (e.g., the public key 304) read from the flash memory; and comparing the first digital signature value with the second digital signature value. If the first digital signature value is the same as the second digital signature value, the IoT device 100 may determine that the digital signature is correct, and the method 600 proceeds to operation 606; otherwise, the IoT device 100 may determine that the digital signature is incorrect and the method 600 proceeds to operation 612.

In operation 608, the IoT device 100 may determine whether the image is correct. The image may refer to a code image of executable programs stored in a flash memory (e.g., flash memory 116). In some embodiments, the operation 608 may include: reading a first image key (e.g., image hash value 306) directly from the flash memory; generating a second image key based on a code image (e.g., image 310) using a cryptographic algorithm; and comparing the first image key with the second image key. If the first image key is the same as the second image key, the IoT device 100 may determine that the image is correct and method 600 proceeds to operation 610; otherwise, the IoT device 100 may determine that the image is incorrect and the method 600 proceeds to operation 612.

In operation 610, the IoT device 100 may boot the SoC 102. If no additional secure boot operations are required, the IoT device 100 may boot the SoC 102. Alternatively, the IoT device 100 may perform one or more additional secure boot operations, e.g., configuring the flash memory, configuring the processor, etc. before booting the SoC 102.

In operation 612, the IoT device 100 may cease the booting of the SoC 102. The operation 612 may be caused by a failure to pass one or more of the secure check operations and may indicate that the IoT device 100 is attacked. Hence the booting of the IoT device 100 is ceased.

EXAMPLES

1. A method comprising:
    loading a patch on a flash memory of a system-on-chip (SoC);
    generating a patch key corresponding to the loaded patch using a cryptographic algorithm;
    reading a pre-determined authentication key from a one-time programmable (OTP) memory of the SoC;
    comparing the patch key with the authentication key; and
    in response to a comparison result that the patch key is the same as the authentication key,
        authenticating the patch;
        executing the authenticated patch on the SoC; and
        booting the SoC with the authenticated patch executed on the SoC.
2. The method of example 1, further comprising:
    in response to a comparison result that the patch key is different from the authentication key,
    configuring the SoC to skip the patch; and
    booting the SoC with the patch skipped.
3. The method of any of the preceding examples, further comprising: in response to a comparison result that the patch key is different from the authentication key,
    generating a notification that the patch is incorrect.
4. The method of any of the preceding examples, wherein the booting of the SoC with the authenticated patch executed on the SoC comprises: determining whether at least one requirement for a secure boot is satisfied; and in response to determining that the at least one requirement for the secure boot is not satisfied, ceasing the booting of the SoC.
5. The method of any of the preceding examples, wherein the at least one requirement comprises: a first public key value read directly from the OTP memory being the same as a second public key value calculated by a public key read from the OTP memory and a cryptographic algorithm.
6. The method of any of the preceding examples, wherein the at least one requirement comprises:
    a first digital signature value calculated based on signature data using a cryptographic algorithm from the flash memory being the same as a second digital signature, wherein the second digital signature value is generated based on a digital signature read from the flash memory and a public key read from the flash memory.
7. The method of any of the preceding examples, wherein the at least one requirement comprises:
    a first image key read directly from the flash memory being the same as a second image key, wherein the second image key is generated based on a code image read from the flash memory.
8. The method of any of the preceding examples, wherein the comparing the patch key with the authentication key comprises:
    comparing a first 32 bits of the patch key with a first 32 bits of the authentication key.
9. The method of any of the preceding examples, wherein the loading of the patch on the flash memory comprises:
    reading first data from the OTP memory, the first data relating to a pre-determined patch address in the flash memory;
    reading second data from the OTP memory, the second data relating to a pre-determined patch loading address in the flash memory; and loading the patch stored in the pre-determined patch address of the flash memory on the pre-determined patch loading address of the flash memory.
10. The method of any of the preceding examples, wherein the executing of the authenticated patch on the SoC comprises:
    changing at least one hardware property of the SoC based on the authenticated patch.
11. The method of any of the preceding examples, wherein the changing of the at least one hardware property of the SoC based on the authenticated patch comprises:
    changing a clock frequency of the flash memory based on the authenticated patch.
12. The method of any of the preceding examples, wherein the executing of the authenticated patch on the SoC comprises:
    changing at least one software function related to the booting of the SoC based on the authenticated patch.
13. A system-on-chip (SoC) comprising:
    a flash memory configured to store a patch;
    a processor configured to:
        load the patch on the flash memory;
        generate a patch key corresponding to the loaded patch using a cryptographic algorithm;
        read a pre-determined authentication key from a one-time programmable (OTP) memory of the SoC;
        compare the patch key with the authentication key; and
        in response to a comparison result that the patch key is the same as the authentication key,
            authenticate the patch;
            execute the authenticated patch on the SoC; and
            boot the SoC with the authenticated patch executed on the SoC.
14. The SoC of example 13, wherein the processor is further configured to:
    in response to a comparison result that the patch key is different from the authentication key,
    configure the SoC to skip the patch; and
    boot the SoC with the patch skipped.
15. The SoC of any of the preceding examples, wherein the processor is further configured to:
    in response to a comparison result that the patch key is different from the authentication key,
    generate a notification that the patch is incorrect.
16. The SoC of any of the preceding examples, wherein to boot of the SoC with the authenticated patch executed on the SoC, the processor is configured to:
    determine whether at least one requirement for a secure boot is satisfied; and
    in response to determining that the at least one requirement for the secure boot is not satisfied, cease the booting of the SoC.

17. The SoC of any of the preceding examples, wherein to load of the patch on the flash memory, the processor is configured to:
read first data from the OTP memory, the first data relating to a pre-determined patch address in the flash memory;
read second data from the OTP memory, the second data relating to a pre-determined patch loading address in the flash memory; and load the patch stored in the pre-determined patch address of the flash memory on the pre-determined patch loading address of the flash memory.

18. The SoC of any of the preceding examples, wherein to execute the authenticated patch on the SoC, the processor is configured to: change at least one hardware property of the SoC based on the authenticated patch.

19. The SoC of any of the preceding examples, wherein to execute the authenticated patch on the SoC, the processor is configured to;
change at least one software function related to the booting of the SoC based on the authenticated patch.

20. A non-transitory computer-readable storage medium, the computer-readable storage medium including instructions that when executed by a computer, cause the computer to:
load a patch on a flash memory of a system-on-chip (SoC);
generate a patch key corresponding to the loaded patch using a cryptographic algorithm;
read a pre-determined authentication key from a one-time programmable (OTP) memory of the SoC;
compare the patch key with the authentication key; and
in response to a comparison result that the patch key is the same as the authentication key,
authenticate the patch;
execute the authenticated patch on the SoC; and
boot the SoC with the authenticated patch executed on the SoC.

CONCLUSION

The present disclosure relates to a method, a system, and an apparatus for patching a secure boot of an IoT device. The present disclosure includes providing a secure method to patch the secure boot and providing a method for verification and executing the patch before verifying the digital signature so that the verification of the digital signature can be patched. The present disclosure has at least the following three advantages: 1. The software code related to secure boot, including the verification of the digital signature, can be patched. 2. System configuration related to the secure boot, including the verification of the digital signature (e.g., the clock frequency of flash memory), can be patched. 3. The verification of the patch is fast.

What is claimed is:

1. A method for authenticating and executing a patch before booting a system-on-chip (SoC) the method comprising:
loading a patch on a flash memory of the SoC, wherein the patch is executable to change at least one of a hardware configuration or a software configuration related to booting of the SoC;
generating a patch key corresponding to the loaded patch using a cryptographic algorithm;
reading a pre-determined authentication key from a one-time programmable (OTP) memory of the SoC;
comparing the patch key with the authentication key; and
in response to a comparison result that the patch key is the same as the authentication key,
authenticating the patch;
executing the authenticated patch on the SoC to change the at least one of the hardware configuration or the software configuration related to the booting-of the SoC, wherein the changing of the hardware configuration of the SoC based on the authenticated patch comprises changing a clock frequency of the flash memory based on the authenticated patch; and
booting the SoC using the changed at least one of the hardware configuration or the software configuration related to the booting of the SoC.

2. The method of claim 1, further comprising:
in response to a comparison result that the patch key is different from the authentication key,
configuring the SoC to skip the patch; and
booting the SoC with the patch skipped.

3. The method of claim 1, further comprising in response to a comparison result that the patch key is different from the authentication key, generating a notification that the patch is incorrect.

4. The method of claim 1, wherein the booting of the SoC with the authenticated patch executed on the SoC comprises:
determining whether at least one requirement for a secure boot is satisfied; and
in response to determining that the at least one requirement for the secure boot is not satisfied, ceasing the booting of the SoC.

5. The method of claim 4, wherein the at least one requirement comprises a first public key value read directly from the OTP memory being the same as a second public key value calculated by a public key read from the OTP memory and a cryptographic algorithm.

6. The method of claim 4, wherein the at least one requirement comprises a first digital signature value calculated based on signature data using a cryptographic algorithm from the flash memory being the same as a second digital signature, wherein the second digital signature value is generated based on a digital signature read from the flash memory and a public key read from the flash memory.

7. The method of claim 4, wherein the at least one requirement comprises a first image key read directly from the flash memory being the same as a second image key, wherein the second image key is generated based on a code image read from the flash memory.

8. The method of claim 1, wherein the comparing the patch key with the authentication key comprises comparing a first 32 bits of the patch key with a first 32 bits of the authentication key.

9. The method of claim 1, wherein the loading of the patch on the flash memory comprises:
reading first data from the OTP memory, the first data relating to a pre-determined patch address in the flash memory;
reading second data from the OTP memory, the second data relating to a pre-determined patch loading address in the flash memory; and
loading the patch stored in the pre-determined patch address of the flash memory on the pre-determined patch loading address of the flash memory.

10. A system-on-chip (SoC) comprising:
a flash memory configured to store a patch;
a processor configured to:

load the patch on the flash memory, wherein the patch is executable to change at least one of a hardware configuration or a software configuration related to booting of the SoC;
generate a patch key corresponding to the loaded patch using a cryptographic algorithm;
read a pre-determined authentication key from a one-time programmable (OTP) memory of the SoC;
compare the patch key with the authentication key; and
in response to a comparison result that the patch key is the same as the authentication key,
authenticate the patch;
execute the authenticated patch on the SoC to change the at least one of the hardware configuration or the software configuration related to the booting of the SoC, wherein the changing of the hardware configuration of the SoC based on the authenticated patch comprises changing a clock frequency of the flash memory based on the authenticated patch; and
boot the SoC using the changed at least one of the hardware configuration or the software configuration related to the booting of the SoC.

11. The SoC of claim 10, wherein the processor is further configured to:
in response to a comparison result that the patch key is different from the authentication key,
configure the SoC to skip the patch; and
boot the SoC with the patch skipped.

12. The SoC of claim 10, wherein the processor is further configured to in response to a comparison result that the patch key is different from the authentication key, generate a notification that the patch is incorrect.

13. The SoC of claim 10, wherein to boot of the SoC with the authenticated patch executed on the SoC, the processor is configured to:
determine whether at least one requirement for a secure boot is satisfied; and
in response to determining that the at least one requirement for the secure boot is not satisfied, cease the booting of the SoC.

14. The SoC of claim 10, wherein to load of the patch on the flash memory, the processor is configured to:
read first data from the OTP memory, the first data relating to a pre-determined patch address in the flash memory;
read second data from the OTP memory, the second data relating to a pre-determined patch loading address in the flash memory; and
load the patch stored in the pre-determined patch address of the flash memory on the pre-determined patch loading address of the flash memory.

15. A non-transitory computer-readable storage medium, the computer-readable storage medium including instructions for authenticating and executing a patch before booting a system-on-chip (SoC) that when executed by a computer, cause the computer to:
load a patch on a flash memory of the SoC, wherein the patch is executable to change at least one of a hardware configuration or a software configuration related to booting of the SoC;
generate a patch key corresponding to the loaded patch using a cryptographic algorithm;
read a pre-determined authentication key from a one-time programmable (OTP) memory of the SoC;
compare the patch key with the authentication key; and
in response to a comparison result that the patch key is the same as the authentication key,
authenticate the patch;
execute the authenticated patch on the SoC to change the at least one of the hardware configuration or the software configuration related to the booting of the SoC, wherein the changing of the hardware configuration of the SoC based on the authenticated patch comprises changing a clock frequency of the flash memory based on the authenticated patch; and
boot the SoC using the changed at least one of the hardware configuration or the software configuration related to the booting of the SoC.

\* \* \* \* \*